G. C. THAYER.
BEET TOPPING MACHINE.
APPLICATION FILED APR. 13, 1916.
1,221,775.
Patented Apr. 3, 1917.
3 SHEETS—SHEET 3.
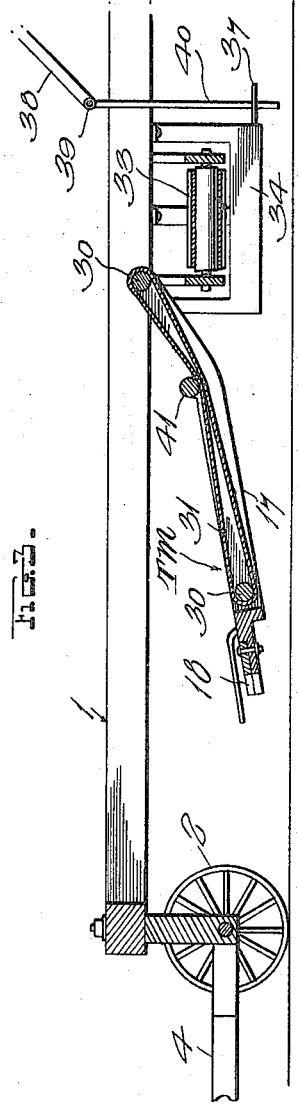
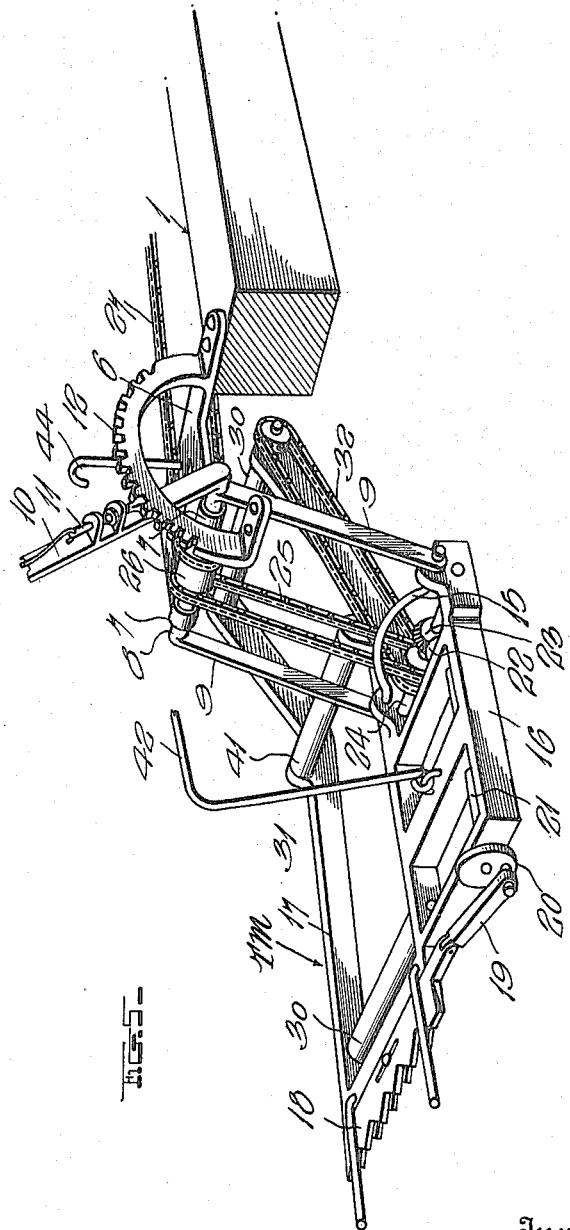
Inventor
Garrison C. Thayer

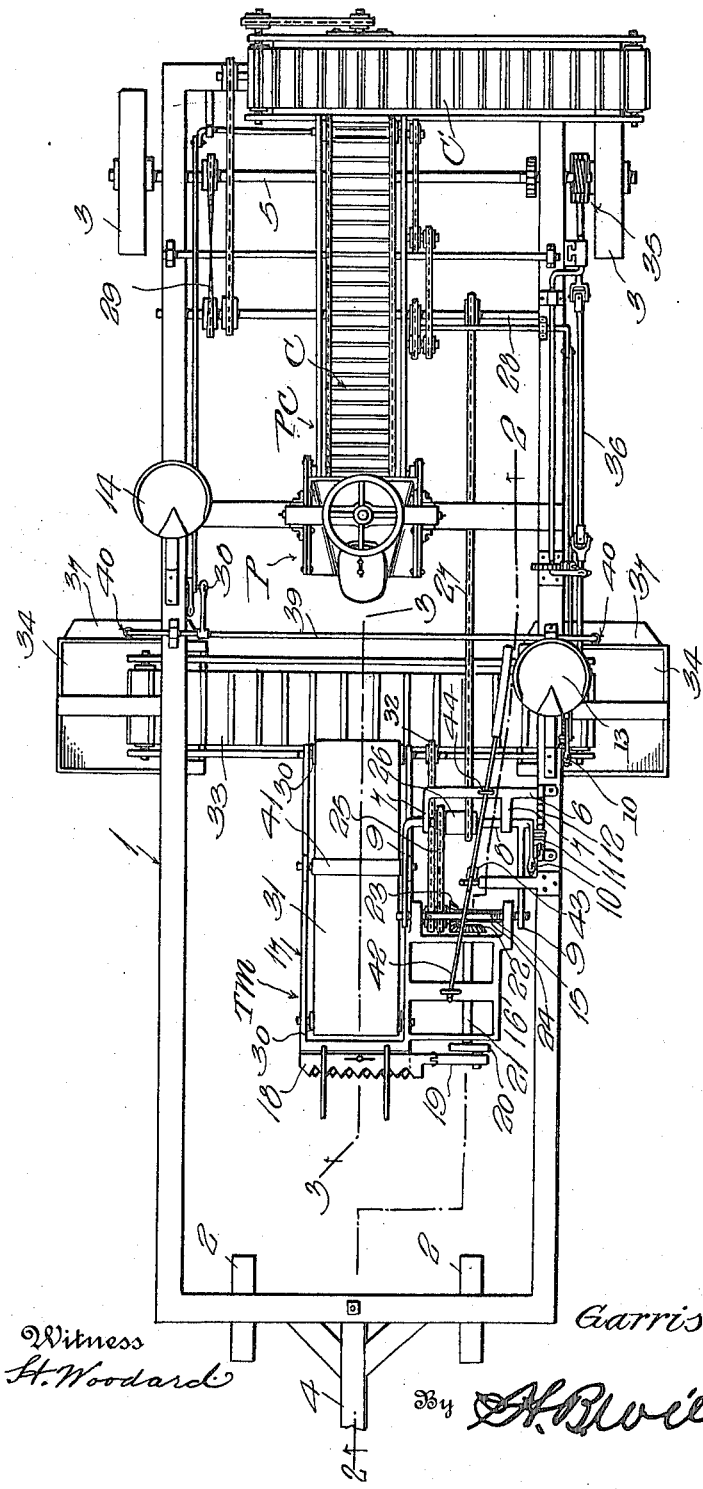

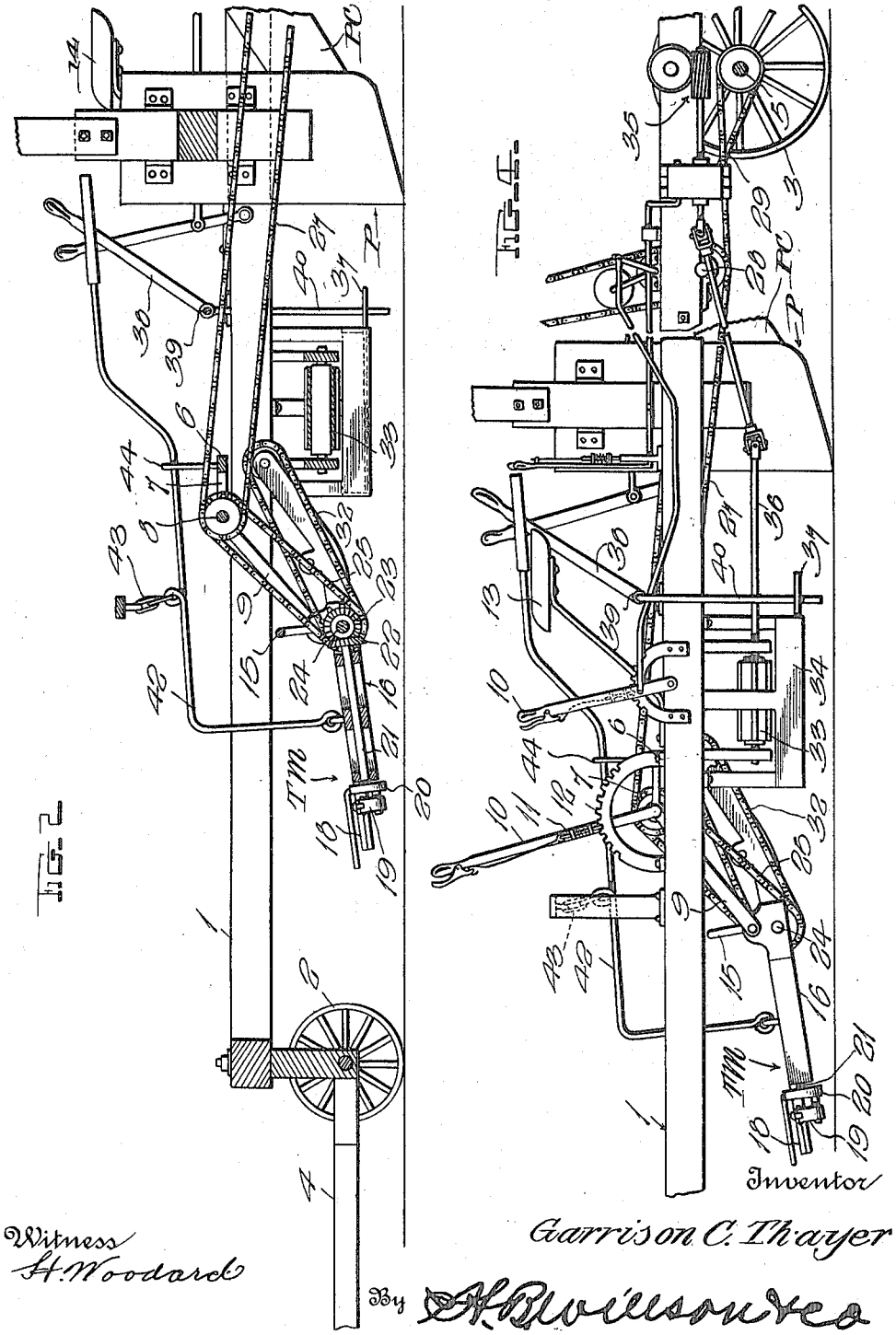

UNITED STATES PATENT OFFICE.

GARRISON C. THAYER, OF BARTLESVILLE, OKLAHOMA.

BEET-TOPPING MACHINE.

1,221,775.     Specification of Letters Patent.     Patented Apr. 3, 1917.

Application filed April 13, 1916. Serial No. 90,946.

*To all whom it may concern:*

Be it known that I, GARRISON C. THAYER, a citizen of the United States, residing at Bartlesville, in the county of Washington and State of Oklahoma, have invented certain new and useful Improvements in Beet-Topping Machines; and I do declare the following to be a full, clear, and exact description of the invention, such as will enable others skilled in the art to which it appertains to make and use the same.

My invention relates broadly to improvements in agricultural implements and specifically to beet topping machines, the present invention being designed primarily for use on the same frame with but in advance of a particular type of beet pulling and conveying mechanism upon which my copending application Serial No. 90945 is based. It will be understood, however, that the use of the present invention need not be limited to application in conjunction with said pulling and conveying mechanism.

The object of the invention is to provide a machine of the class described which although being comparatively simple and inexpensive will be highly efficient and durable, provision being made whereby the cutting means may be moved vertically at will to allow all of the beet tops to be severed immediately adjacent the beet.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a top plan view of the invention showing its relation in respect to the pulling and conveying mechanism above referred to;

Fig. 2 is an enlarged longitudinal section taken on the plane of the line 2—2 of Fig. 1;

Fig. 3 is a similar view on the plane of the line 3—3 of Fig. 1;

Fig. 4 is an enlarged side elevation; and

Fig. 5 is a detail perspective view of the vertically movable frame which carries the reciprocating cutter, the driving means therefor, and a conveyer for carrying the beet tops rearwardly.

In specifically describing the construction shown in the drawings above briefly described, similar characters will be placed on corresponding parts throughout the several views, and reference will be herein made to the numerous elements by their respective indices. To this end, the numeral 1 designates a main frame mounted on front wheels 2 and rear wheels 3, the axle of the wheels 2 being connected with a tongue 4 while the axle 5 of the rear wheels 3 is rotatably mounted in suitable bearings and serves to drive all moving parts of a topping mechanism TM which constitutes the subject matter of the present case and a pulling and conveying mechanism PC shown and described in the U. S. application above referred to.

Briefly speaking, the mechanism PC comprises a vertically adjustable plow P for removing the beets from the earth, an endless belt conveyer C extending rearwardly from said plow, and a second conveyer C' onto which the conveyer C delivers, said conveyer C' being adapted to carry the beets to either side of the machine it being reversible for this purpose. If further details of the mechanism PC are required, reference may be made to the above referred to application, since the present case need not be encumbered with a more specific description.

The topping mechanism TM comprises in brief, means for cutting the tops from the beets, means for conveying the tops rearwardly, a frame upon which the cutting and conveying means are mounted, a permanent adjustment for holding said frame at any one of a number of predetermined heights, and means under the control of the operator for further moving said frame vertically in either direction from its adjusted position to allow the cutter to be properly disposed in relation to the beets, regardless of the distance which the latter may protrude from the earth. This arrangement of parts is preferably constructed in the manner now to be specifically described.

A rigid arm 6 is secured to and extends inwardly from one side bar of the frame 1, said arm having thereon a pair of bearings 7 which preferably extend forwardly. A transverse horizontal rock shaft 8 is mounted in the bearings 7 and is provided with a pair of rigid crank arms 9, which will usually incline downwardly and forwardly as shown. For adjusting the rock shaft 8 to dispose the lower ends of the arms 9 at any one of a number of predetermined heights, a hand lever 10 is rigidly secured to one end of said shaft, said lever being shown in the present embodiment of the invention as provided with a spring pressed pawl 11 coöperating with a rack 12. The lever 10 as shown most clearly in Figs. 1 and 4 is disposed within easy reach of a seat 13 which will be occupied by the operator of the topping mechanism, another seat 14 being disposed on the machine for the operator of the mechanism PC.

An arched shaft 15 extends between the lower ends of the crank arms 9, said shaft serving as a pivotal connection between said arms and the rear end of a horizontal frame 16 which will be connected in any appropriate manner to a longitudinally extending conveyer frame 17 which is spaced laterally therefrom. A reciprocating cutter 18 is mounted at the front end of the frame 17 and is driven by a pitman 19 from a crank disk or the like 20 on the front end of a longitudinal shaft 21, which shaft is rotatably mounted on the frame 16.

The rear end of the shaft 21 has thereon a beveled gear 22 meshing with a similar gear 23 on a transverse shaft 24 mounted rotatably upon the rear end of the frame 16, said shaft 24 being driven by a sprocket chain 25 from a rotating sleeve 26 on the rock shaft 8. The sleeve 26 is in turn driven by a sprocket chain 27 leading from a transverse shaft 28 adjacent the rear end of the machine, movement being imparted to the last named shaft by a crossed sprocket chain or the like 29 which is driven from the axle 5. This manner of driving the cutter 18 is effective regardless of the position to which the frame 16 may be adjusted.

Front and rear rollers or the like 30 are disposed at the front and rear ends of the conveyer frame 17 and an endless belt conveyer 31 is trained around said rollers, the rearmost of the latter being driven by a sprocket chain 32 from the shaft 24. The rear end of the frame 17 as shown clearly in Figs. 2, 3 4 and 5 is inclined upwardly and rearwardly in order that the endless belt 31 may deliver onto a transverse conveyer 33. This last named belt is adapted to carry the beet tops from the belt 31 and deliver them into either of a pair of boxes 34 disposed one at each side of the machine, the belt in question being driven by a reversible worm gear 35 and a flexible shaft 36 (see Figs. 1 and 4). Thus, it will be evident that the direction of movement of the belt 31 may be so controlled as to deposit the tops in either of the boxes 34. These boxes are provided with sliding bottoms 37 which may be opened by proper actuation of a hand lever 38 disposed adjacent the seat 14, said lever being secured to a transverse rock shaft 39 while the latter is provided with depending crank arms 40 which extend through apertures in the rear ends of the bottoms 37.

In order to compress the beet tops and thus allow a greater number thereof to be received in either of the boxes 34, a transverse roller 41 overlies the upper reach of the endless belt 31, it being obvious that since said reach moves rearwardly it will carry the beet tops beneath this roller which will accomplish the desired end.

It is to be observed that the frames 16 and 17 are free to swing as a unit upon the pivotal connection of the former with the arms 9, this being expedient in order that the front end of the frame 17 may be moved vertically at will for proper engagement of the cutter 18 with the beet tops. For so moving said front end of the frame 17, a hand lever 42 is fulcrumed on a chain or the like 43, said lever having its rear end disposed within easy reach of the operator who occupies the seat 13. By this arrangement, the lever 42 may be easily operated with one hand to obtain the desired results. When the use of the lever 42 is no longer necessary it may be held against further movement by engaging it with a hook 44 which rises from the arm 6 after which the lever 10 may be adjusted to raise the entire topping mechanism free of the earth to allow the machine to be transported from place to place.

From the foregoing, taken in connection with the accompanying drawings, the construction, manner of operation and advantages of the improved machine will be readily understood without requiring a more extended explanation. In conclusion, however, I wish to state that although certain specific details of construction have been shown and described for accomplishing probably the best results, numerous changes may be made within the scope of the invention as claimed.

I claim:

1. In a beet topping mechanism, the combination of a portable frame and a vertically movable frame, a pivotal mounting for the latter to permit its front end to move vertically, means for raising and lowering said pivotal mounting and locking it in adjusted position, a beet topper mounted on said vertically movable frame, and means for tilting said frame vertically around its pivotal mounting at the will of the operator.

2. In a beet topping mechanism, the combination of a portable frame, a transverse rock shaft mounted thereon, rigid crank arms depending from said rock shaft, an auxiliary frame pivoted to said crank arms for vertical oscillation, means for rocking said shaft and holding it in adjusted position to raise and lower the auxiliary frame, a beet topper mounted on said auxiliary frame, and means at the control of the operator for tilting said auxiliary frame around its pivotal mounting.

3. In a beet topping mechanism, the combination of a portable frame, a transverse rock shaft mounted thereon, a number of rigid crank arms depending from said rock shaft, an auxiliary frame pivotally connected with said crank arms, means for turning said rock shaft and locking it in adjusted position to vary the height of the auxiliary frame, a beet topper mounted on said auxiliary frame, driving means for said topper including a driven member rotatably mounted on the rock shaft, a shaft mounted on the auxiliary frame adjacent the pivot of the latter, and a sprocket chain leading from said driven member to said shaft, and means for tilting the auxiliary frame around its pivotal mounting.

4. In a beet topping mechanism, the combination of a portable frame and an auxiliary frame, a beet topping cutter disposed at the front end of said auxiliary frame, a conveyer mounted on said frame and leading rearwardly from said cutter, a pivotal mounting for said auxiliary frame, means for adjusting said pivotal mounting vertically and locking it in adjusted position, and means for tilting said auxiliary frame around said pivotal mounting at the will of the operator.

In testimony whereof I have hereunto set my hand in presence of two subscribing witnesses.

GARRISON C. THAYER.

Witnesses:
GEORGE B. KEELER,
J. E. CATO.

Copies of this patent may be obtained for five cents each, by addressing the "Commissioner of Patents Washington, D. C."